US007545057B1

(12) United States Patent
Roo et al.

(10) Patent No.: US 7,545,057 B1
(45) Date of Patent: Jun. 9, 2009

(54) RELAY CIRCUITRY AND SWITCHING CIRCUITRY FOR POWER-OVER-NETWORK DEVICES

(75) Inventors: Pierte Roo, Sunnyvale, CA (US); Wyant Chan, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 787 days.

(21) Appl. No.: 11/030,002

(22) Filed: Jan. 4, 2005

(51) Int. Cl.
*H01H 47/00* (2006.01)
*H01H 47/04* (2006.01)

(52) U.S. Cl. .................. 307/116; 307/112; 307/126; 307/139

(58) Field of Classification Search .............. 307/109, 307/112–113, 116, 125, 130, 139–140
See application file for complete search history.

(56) References Cited

U.S. PATENT DOCUMENTS

| 4,780,714 | A | 10/1988 | Moustakas et al. |
|---|---|---|---|
| 5,032,819 | A | 7/1991 | Sakuragi et al. |
| 5,224,154 | A | 6/1993 | Aldridge et al. |
| 5,375,051 | A | 12/1994 | Decker et al. |
| 5,406,260 | A | 4/1995 | Cummings et al. |
| 5,410,535 | A | 4/1995 | Yang et al. |
| 5,414,708 | A | 5/1995 | Webber et al. |
| 5,577,023 | A | 11/1996 | Marum et al. |
| 5,799,069 | A | 8/1998 | Weston et al. |
| 5,809,026 | A | 9/1998 | Wong et al. |
| 5,848,376 | A | 12/1998 | Steiner et al. |
| 5,892,926 | A | 4/1999 | Witkowski et al. |
| 5,923,663 | A | 7/1999 | Bontemps et al. |
| 5,943,404 | A | 8/1999 | Sansom et al. |
| 6,175,865 | B1 | 1/2001 | Dove et al. |
| 6,243,756 | B1 | 6/2001 | Whitmire et al. |
| 6,272,552 | B1 | 8/2001 | Melvin et al. |
| 6,531,913 | B1* | 3/2003 | Ross ........................... 327/536 |
| 7,184,510 | B2* | 2/2007 | Jung ........................... 375/374 |
| 2006/0092000 | A1* | 5/2006 | Karam et al. .......... 340/310.11 |
| 2007/0171690 | A1* | 7/2007 | Apfel .......................... 363/127 |
| 2007/0206774 | A1* | 9/2007 | Vorenkamp et al. ......... 379/310 |
| 2008/0040625 | A1* | 2/2008 | Vorenkamp et al. ......... 713/340 |

FOREIGN PATENT DOCUMENTS

| EP | 0 273 080 | 7/1988 |
|---|---|---|
| EP | 0 577 435 | 1/1994 |
| EP | 0 596 523 | 5/1994 |
| WO | WO 94/13072 | 6/1994 |
| WO | WO 96/19877 | 6/1996 |
| WO | WO 00/54419 | 9/2000 |
| WO | WO 01/11861 | 2/2001 |

* cited by examiner

*Primary Examiner*—Albert W Paladini
*Assistant Examiner*—Adi Amrany

(57) ABSTRACT

Relay circuitry for a power-over-network device is provided. The relay circuitry allows power-supplying network devices to identify and subsequently to supply power across a network connection to the power-over-network device, thereby eliminating the need for external power sources. The relay circuitry is operative using only the signals transmitted along a data line across the network connection. The relay circuitry is integrated together with switching circuitry on-chip on the power-over-network device. The relay circuitry and switching circuitry are further designed to propagate both the test signals and the subsequent data signals prior to and after the turning on of the power-over-network device, respectively, with minimal signal degradation.

47 Claims, 5 Drawing Sheets

RELAY CIRCUITRY AND SWITCHING CIRCUITRY FOR POWER-OVER-NETWORK DEVICES

BACKGROUND OF THE INVENTION

The present invention relates to circuitry for power-over-network devices, such as power-over-Ethernet ("POE") devices, that are powered by a network data cable rather than a separate power source. More particularly, the present invention relates to integrated, on-chip relay circuitry for such network devices.

One recent advance with respect to Ethernet network technology has been in the development of power-over-Ethernet devices. As the name suggests, POE devices are powered solely by the Ethernet cable to which they are connected and therefore do not require power from an external AC power source. U.S. patent application Ser. No. 10/098,865, filed on Mar. 15, 2002, for example, describes systems and methods for detecting network devices such as POE devices that are connected to a network and for subsequently supplying power to those connected network devices via a separately connected power-supplying network device. Particularly, application Ser. No. 10/098,865 describes a technique for detecting the presence of a power-over-network device that is capable of being powered on through a network connection, in which the power-supplying device generates a series of test signals and checks whether an appropriate response is received. In order to provide the appropriate response to the power-supplying device, the power-over-network device may include filter circuitry for processing the test signals so that they may ultimately be recognized by the power-supplying device, in addition to relay circuitry that is in a closed-switch state during the detection period in order to relay the filtered test signals to the power-supplying device. Once the power-supplying network device detects a response from the power-on capable device, it then begins to supply power across the network link. Also at that time, the relay circuitry of the power-over-network device switches open and a separate switching circuitry switches closed so that the normal operation of the power-over-network device may commence.

Traditionally, the relay circuitry described above for such power-over-network devices are implemented off-chip and external from the rest of the device circuitry. One notable disadvantage caused by implementing the relay circuitry off-chip is the added cost of the circuitry due to a relative increase in the amount of required die. Therefore, in view of the foregoing, it would be desirable to design relay circuitry that is implemented on-chip with the other circuitry of a power-over-network device. It would further be desirable to design on-chip relay circuitry that is configured to relay the test signals transmitted by power-supplying devices without power and with minimal signal degradation so as to reduce the probability of failure during device detection and to thereby make the system more robust. It would be desirable to design on-chip relay circuitry that is integrated with the previously described switching circuitry in order to further increase the performance of and reduce the size and cost of the power-over-network device.

SUMMARY OF THE INVENTION

In accordance with the present invention, an integrated, on-chip relay circuitry and switching circuitry that is used in connection with detecting the presence of power-over-network devices such as POE devices and with subsequently supplying power to those devices is provided. The relay circuitry utilizes the test signals that are transmitted to and received by the power-over-network device to bring the relay circuitry to a closed-switch state with minimal signal loss and relatively little load capacitance. Specifically, the relay circuitry includes circuitry that is configured to store charge when the inputs are of one polarity, and to use the stored charged to drive the relay circuitry to a closed-switch state when the inputs are of the reverse polarity. The switching circuitry is configured to efficiently shut off the relay circuitry when power is supplied to the network device.

Further features of the invention, its nature and various advantages will be more apparent from the accompanying drawings and the following detailed description.

DETAILED DESCRIPTION OF THE PREFERRED EMBODIMENTS

Figure 1:
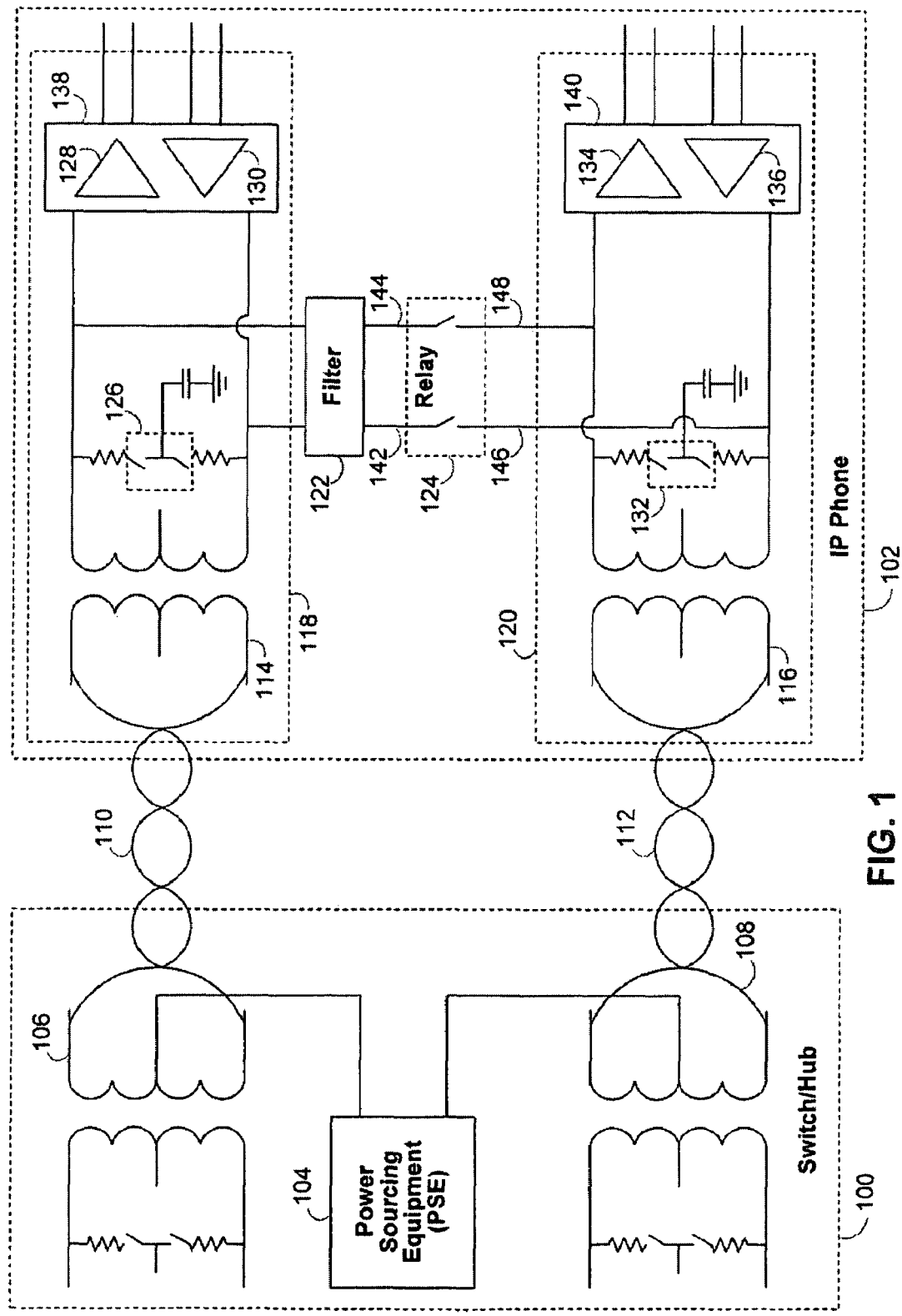
FIG. 1 is a simplified system-level diagram of an illustrative embodiment of a power-over-network device in which the relay circuitry and switching circuitry in accordance with the present invention is implemented.

FIG. 1 shows an illustrative embodiment of a typical system in which the circuitry of the present invention is implemented. In FIG. 1, power-supplying network device 100 (such as a switch or a hub) is connected to an Ethernet network to which power-over-network device 102 (such as an Internet Protocol ("IP") telephone) is connected. Although references are made herein to an Ethernet network, such references are merely the purpose of illustration, and it will therefore be understood that the present invention may be realized in other suitable types of networks. Specifically, in FIG. 1, power-supplying network device 100 includes power-sourcing equipment ("PSE") 104 that is connected to the center taps in the primary side of each of power transformers 106 and 108. As a result, the power provided by PSE 104 is supplied over Ethernet links 110 and 112 to the secondary sides of power transformers 114 and 116, which are in turn connected to power-over-network device 102.

The portion of power-over-network device 102 shown in FIG. 1 includes identical interface circuitry 118 and 120. Interface circuitry 118 is connected to interface circuitry 120 through filter 122 and relay circuitry 124 via differential lines 142, 144, 146, and 148. The differential output of the primary side of power transformer 114 is connected to switching circuitry 126 and to transceiver 138 of interface circuitry 118 comprising transmitter circuitry 128 and receiver circuitry 130. Similarly, the differential output of the primary side of power transformer 116 is connected to switching circuitry 132 and to transceiver 140 of interface circuitry 120 comprising transmitter circuitry 134 and receiver circuitry 136. As previously mentioned, during detection, test signal pulses generated by and transmitted from power-supplying network device 100 may be sent to interface circuitry 118 via Ethernet link 110 and relayed back by interface circuitry 120 via Ethernet link 112. Alternatively, because the system operates bidirectionally, the test signals may be transmitted to interface circuitry 120 via link 112 and relayed back by interface circuitry 118 via link 110. During this period, no power is supplied to power-over-network device 102. Switching circuitry 126 and switching circuitry 132 are both in an open state, and relay circuitry 124 is in a closed state. Once power-supplying network device 100 detects the relayed test signals from power-over-network device 102, however, power-supplying network device 100 begins supplying power to power-over-network device 102 across links 110 and 112, and accordingly power-over-network device 102 begins operating in a normal, powered-on mode. Switching circuitry 126 and switching circuitry 132 are subsequently closed, and relay circuitry 124 is open. Interface circuitry 118 and interface circuitry 120 may operate substantially independently during normal operation.

Figure 2:
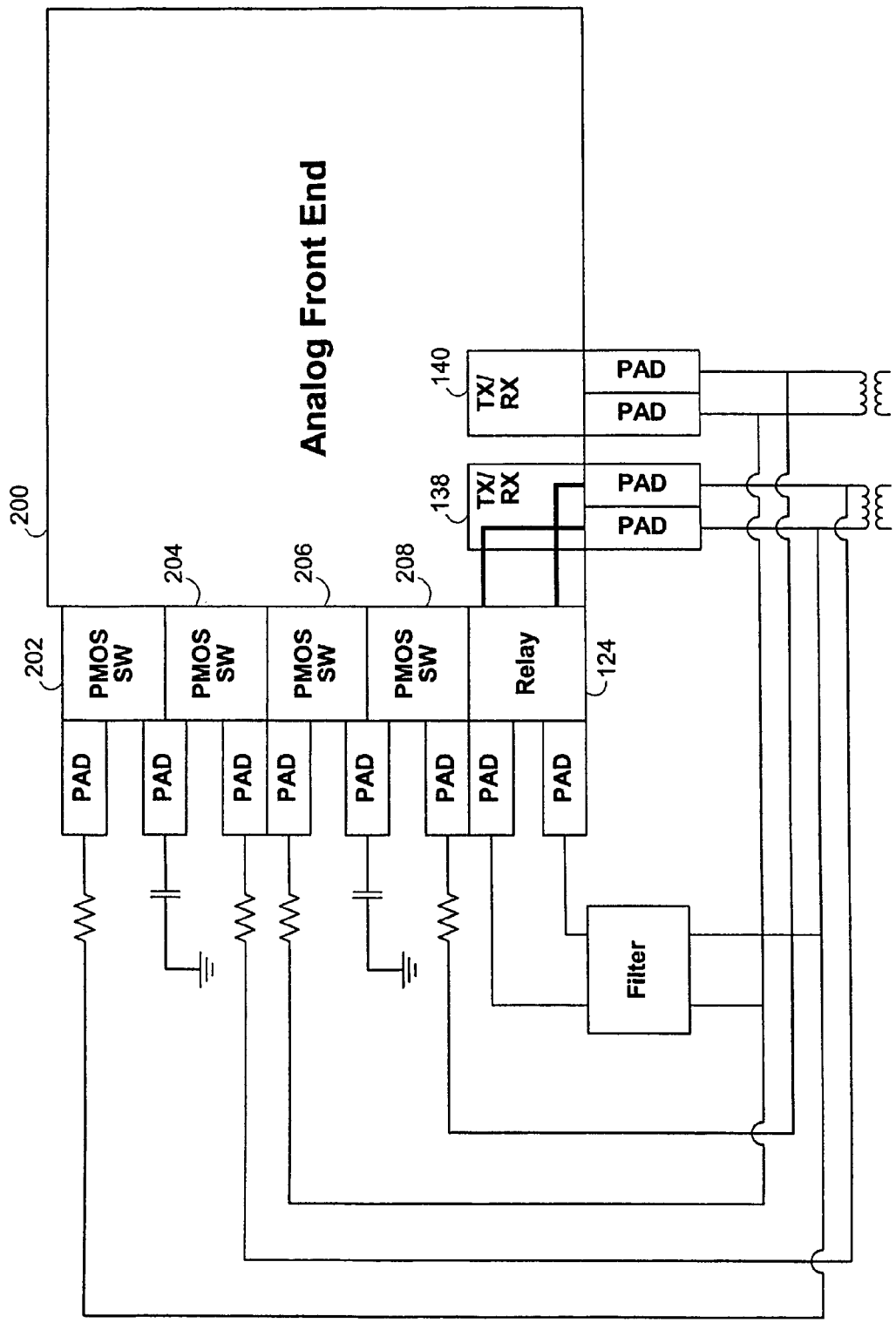
FIG. 2 is another simplified placement-view diagram of an illustrative embodiment of the power-over-network device in accordance with the present invention.

FIG. 2 shows a placement-view diagram of the front-end interface portion of the power-over-network device 102 shown in FIG. 1. Specifically, FIG. 2 shows that the circuitry forming transceiver 138 and 140 may form part of analog front end 200 of power-over-network device 102. Furthermore, as shown in FIG. 2, switching circuitry 126 may, for example, be implemented using PMOS transistors 202 and 204, and similarly switching circuitry 132 may be implemented using PMOS transistors 206 and 208. PMOS transistors 202-208 as well as relay circuitry 124 may be implemented peripherally around analog front end 200. Finally, as shown in FIG. 2, the signal outputs of the integrated circuit portions of power-over-network device 102 comprising PMOS transistors 202-208, relay circuitry 124, and transceivers 138 and 140 are padded with I/O pads.

Figure 3:
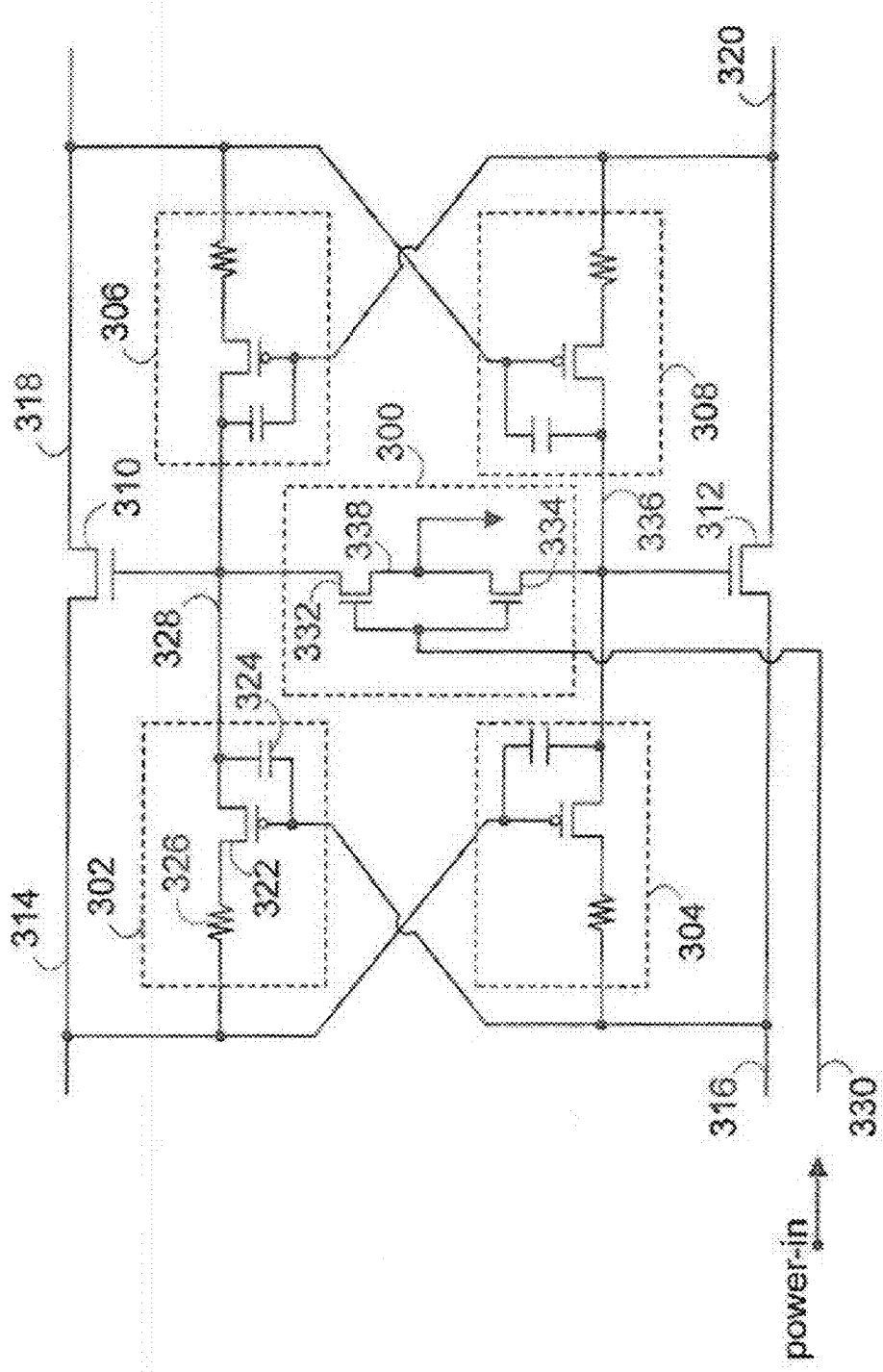
FIG. 3 is a circuit diagram of an illustrative embodiment of the relay circuitry and switching circuitry portion of the power-over-network device in accordance with the present invention.

FIG. 3 shows a circuit-level diagram of an embodiment of relay circuitry 124 and switching circuitry 300 of the present invention. As previously mentioned, the relay and switching circuitry shown in FIG. 3 are integrated on the same on-chip device. Relay circuitry 124 is comprised of charge-pump circuits 302, 304, 306 and 308 and NMOS transistors 310 and 312.

Although charge-pump circuits 302, 304, 306 and 308 are shown as identical circuits in FIG. 3, it will be appreciated that the charge-pump circuits used by the relay circuitry do not have to be identical circuits comprising the same circuit elements or circuit characteristics.

Looking at the arrangement of charge-pump circuits 302, 304, 306 and 308 more closely, it is seen that charge-pump circuits 302 and 304 are connected to the positive and negative differential lines on one side of the differential relay switch, and that charge-pump circuits 306 and 308 are connected to the positive and negative differential lines on the other side of the differential relay switch. (For clarity and consistency, it will be assumed that in FIG. 3, lines 314 and 318 correspond to the positive differential line of the system (e.g., lines 142 and 146 of FIG. 1) and lines 316 and 320 correspond to the negative differential line of the system (e.g., lines 144 and 148 of FIG. 1). However, due to the symmetry in the operation of the circuitry of the present invention, it will be understood that the positive and negative differential lines may be interchanged without any effect on the operation of the circuitry.) As previously mentioned, the purpose of connecting charge-pump circuits 302, 304, 306 and 308 to either side of the differential relay switch is to support bidirectional operation. Specifically, when data is received on lines 314 and 316, charge-pump circuits 302 and 304 are activated as will be described below in order to allow the data to be relayed onto lines 318 and 320 with minimal signal loss. In particular, charge-pump circuit 302 is used to provide a sufficient amount of additional gate drive in turning on NMOS transistor 310. Similarly, charge-pump circuit 304 is used to more greatly turn on NMOS transistor 312. Conversely, when data is received on lines 318 and 320, charge-pump circuits 306 and 308 are activated in order to allow the data to be relayed onto lines 314 and 316. In particular, charge-pump circuit 306 assists in the turning on of NMOS transistor 310, and charge-pump circuit 308 assists in the turning on of NMOS transistor 312.

Figure 4A:
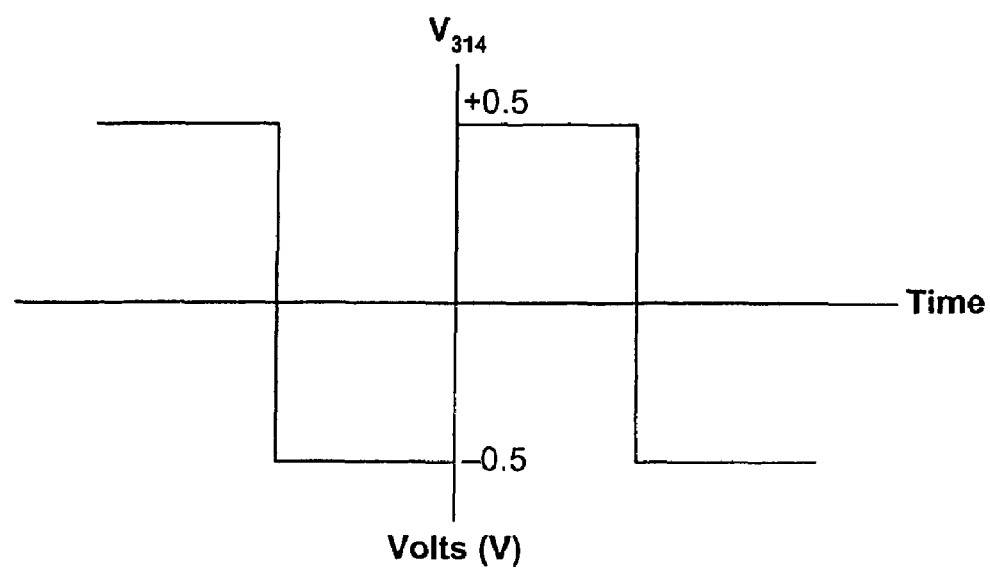
FIGS. 4A and 4B are voltage-signal waveforms of the differential input signals that may be received by the circuitry of the present invention.
Figure 4B:
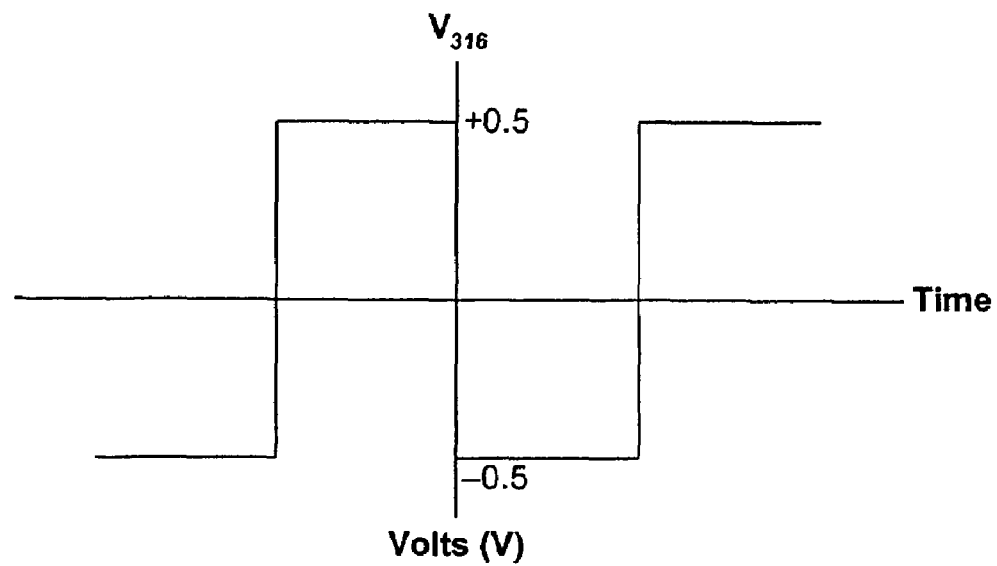

Since each of charge-pump circuits 302, 304, 306 and 308 are identical, the structure and operation of the charge-pump circuits 302, 304, 306 and 308 in the relay and switching circuitry will be discussed with respect to a single, arbitrarily chosen charge-pump circuit, charge-pump circuit 302. Charge-pump circuit 302 is comprised of PMOS transistor 322, capacitor 324, and resistor 326. As previously mentioned, the function of charge-pump circuit 302 is to provide sufficient gate drive to NMOS transistor 310. To more clearly illustrate how this is achieved, reference is made to FIGS. 4A and 4B, which show example differential input signals that may be received on lines 314 and 316. However, since FIG. 3 shows relay circuitry that is implemented bidirectionally, the input signals shown in FIGS. 4A and 4B may alternatively be received on lines 318 and 320. In particular, the input signal waveforms in FIGS. 4A and 4B correspond to square waves each having a 1-volt (V) peak-to-peak voltage centered at 0V. It will be understood that these waveforms are merely exemplary and used only to demonstrate the behavior of charge pump circuit 302 during the different phases of the input signal.

During the first half-period of the input signals on lines 314 and 316 (i.e., the "charge" cycle, or when $V_{314}=+0.5$ V and $V_{316}=-0.5$ V), PMOS transistor 322 is turned on. As a result, the PMOS transistor 322 turns on, thereby allowing line 314 to charge node 328 to 0.5 V, and a charge of 1 V to be stored across capacitor 324. It should be mentioned that the details about PMOS transistor 322 such as its impedance are not critical so long as PMOS transistor 322 is turned on sufficiently for a sufficient duration so that 1 V of charge develops across capacitor 324. For example, it is not necessary for PMOS transistor 322 to be a low impedance device. The actual parameters of the PMOS transistor 322 will naturally vary according to variables such as the characteristics of the input signals on lines 314 and 316 and the size of capacitor 324.

Subsequently, when the polarity of the input signals is reversed (i.e., during the "boost" cycle, or when $V_{314}=-0.5$ V and $V_{316}=+0.5$ V), PMOS transistor 322 shuts off. The combination of the voltage on line 314 and the 1 V stored on capacitor 324 drives node 328 up to approximately 1.5 V. In accordance with the invention, NMOS transistor 310 is designed such that the 1.5 V on node 328 causes NMOS transistor 310 to be turned on hard. It will be appreciated that turning on NMOS transistor 310 hard forces the transistor to operate in a low-impedance region of operation, thereby minimizing the signal loss across NMOS transistor 310 as signals on line 314 are relayed to line 318. Moreover, turning on NMOS transistor 310 hard has the added benefits of reducing the required size of and lowering the parasitic (i.e., gate-to-source) capacitance of NMOS transistor 310, thereby reducing the overall load of relay circuitry 124.

As was mentioned, each of charge-pump circuits 304, 306 and 308 operate principally in the same manner as charge-pump circuit 302. The only difference is that charge-pump circuits 304, 306 and 308 are connected differently and/or connected to different inputs. Specifically, given the input signal waveforms shown in FIGS. 4A and 4B, the charge cycle of charge-pump circuit 304 occurs when the voltage on line 316 is +0.5 V and the voltage on line 314 is −0.5 V, and the boost cycle occurs when the voltage on line 316 is −0.5V and the voltage on line 314 is +0.5V. Therefore, it is seen that during the period when charge-pump circuit 302 is in the charge cycle, charge-pump circuit 304 is in the boost cycle, and vice-versa. Furthermore, as shown in FIG. 3, to support bidirectional operation, charge-pump circuits 306 and 308 similarly turn on NMOS transistors 310 and 312 based on the voltages on lines 318 and 320. In general, it will be understood that relay circuitry 124 remains in a closed-switch state based on the switching action on the differential input signals (i.e., transitions from a logic 1 to a logic 0 and vice-versa). Thus, depending on the frequency with which the input signals on lines 314 and 316, and/or lines 318 and 320 switch, properties of the various elements of relay circuitry 124 such as the transistor and capacitor sizing may be varied and tailored to the input signal pattern.

It will be understood that relay circuitry 124 is only operative when no power is applied to switching circuitry 300. When power is applied on line 330 to switching circuitry 300 (e.g., via PSE 104 of power-supplying network device 100 through either one or both of power transformers 114 and 116), switching circuitry 300 is turned on, bringing the voltage on node 328 to ground and thereby turning off NMOS transistors 310 and 312 of relay circuitry 124. In particular, switching circuitry 300 includes NMOS transistors 332 and 334. When NMOS transistors 332 and 334 are turned on, the voltages on nodes 328 and 336 are pulled down to ground, as defined by the value of center-tap node 338. Resistor 326 of charge-pump circuit 302 limits the current that flows across PMOS transistor 322 and that is therefore lost when power is supplied and forces switching circuitry 300 closed and relay circuitry 124 open (and the same is true of the corresponding resistors of charge-pump circuits 304, 306 and 308), so that the effect of pulling nodes 328 and 336 to ground has minimal impact on the input signals. The value of the resistors may be selected so that, for example, there is no more than 0.5% overall loss in the input signals due to the operation of switching circuitry 300.

Figure 5:
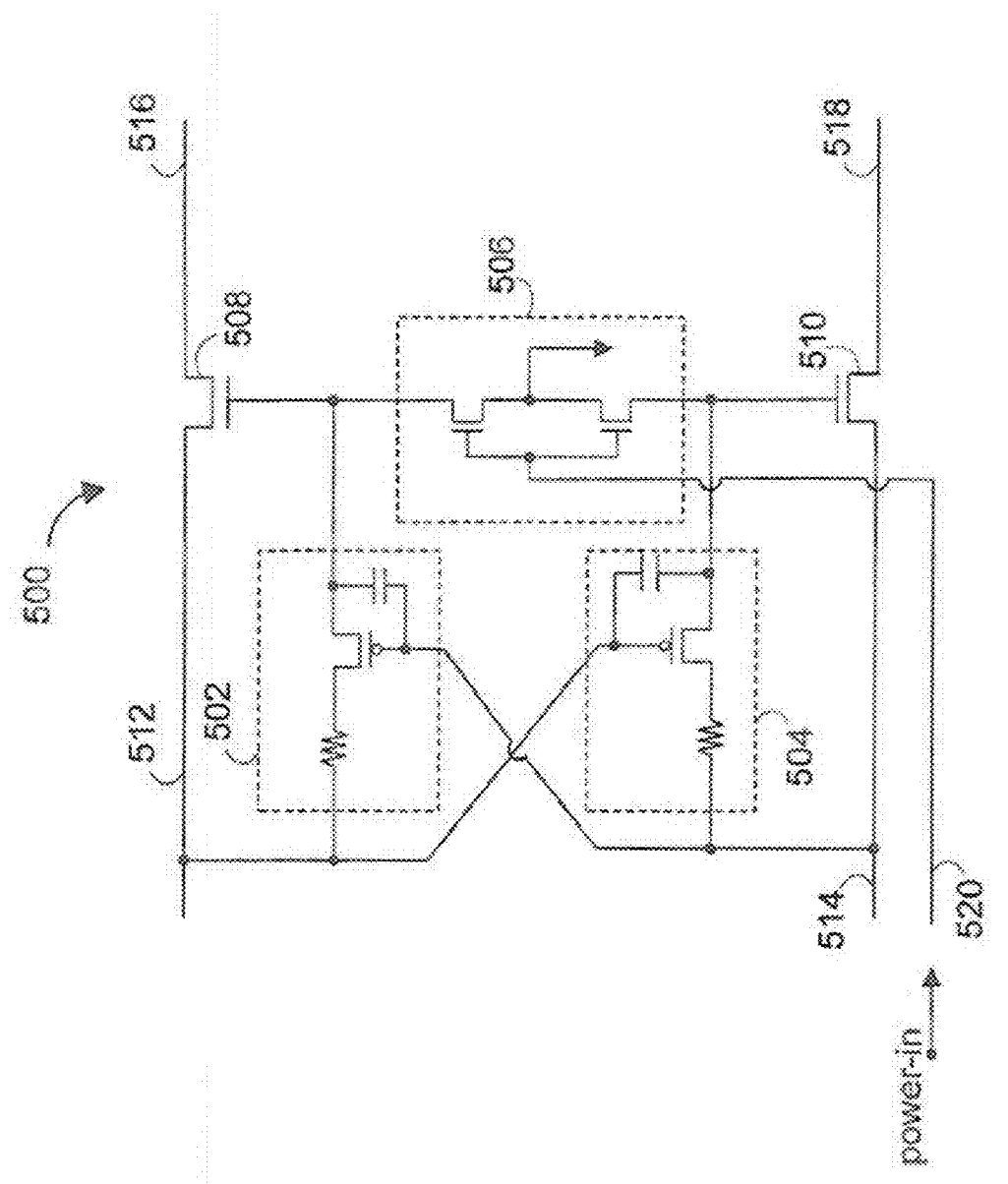
FIG. 5 is an alternative circuit diagram of an illustrative embodiment of the relay circuitry and switching circuitry portion of the power-over-network device in accordance with the present invention.

Although the relay and switching circuitry has been described up until now to be bidirectional, it will be understood that the circuitry of the present invention may alternatively be implemented to only support unidirectional operation. FIG. 5, for example, illustrates the relay and switching circuitry 500 of the present invention that is configured for unidirectional operation. Because the implementation of unidirectional relay and switching circuitry 500 is identical to that of the bidirectional implementation shown in FIG. 3, with the exception of the absence of charge pump circuits 306 and 308 in FIG. 3 from FIG. 5, the operation of circuitry 500 will not be described. It will only be generally mentioned that circuitry 500 includes charge-pump circuits 502 and 504, switching circuitry 506 and NMOS transistors 508 and 510, and that a pair differential of input signals received on lines 512 and 514 (corresponding, e.g., to lines 142 and 144 of FIG. 1) by unidirectional relay and switching circuitry 500 are relayed onto lines 516 and (corresponding, e.g., to lines 146 and 148 of FIG. 1) only when NMOS transistors 508 and 510 are turned on (i.e., when power is not supplied via line 520 to switching circuitry 506).

It will be understood, therefore, that the foregoing is only illustrative of the principles of the invention, and that various modifications can be made by those skilled in the art without departing from the scope and spirit of the invention, and that the present invention is limited only by the claims that follow.

What is claimed is:

1. Relay circuitry that operates in a closed-switch state when power is not supplied by power-sourcing equipment to the circuitry and in an open-switch state when power is supplied by the power-sourcing equipment to the circuitry, the relay circuitry comprising:
   a charge-pump circuit for causing the relay circuitry to be placed in the closed-switch state when power is not supplied by the power-sourcing equipment to the relay circuitry, wherein the charge-pump circuit is operative to store charge from input signals to the relay circuitry when the input signals are of a first polarity, and to use the stored charge to maintain the relay circuitry in the closed-switch state when the input signals are of a second substantially reverse polarity; and
   switching circuitry that is operative to switch the relay circuitry from the closed-switch state to the open-switch state when power is supplied by the power-sourcing equipment to the relay circuitry.

2. The relay circuitry of claim 1 wherein the input signals correspond to a pair of differential input signals, and wherein the relay circuitry comprises a separate charge-pump circuit for each differential input signal.

3. The relay circuitry of claim 1 further comprising:
   relay switch circuitry in communication with the charge-pump circuit and the switching circuitry, wherein the switching circuitry switches the relay switch circuitry from a closed-switch state to an open-switch state in order to switch the relay circuitry from the closed-switch state to the open-switch state.

4. The relay circuitry of claim 3 wherein the relay switch circuitry comprises an NMOS transistor.

5. The relay circuitry of claim 1 wherein the charge-pump circuit comprises:
   a transistor having a gate terminal, a drain terminal, and a source terminal; and
   a capacitor, wherein the capacitor is in communication with both the gate terminal and either the drain or source terminal of the transistor.

6. The relay circuitry of claim 5 wherein the transistor is a PMOS transistor.

7. The relay circuitry of claim 5 wherein the charge-pump circuit further comprises a current-limiting resistor for limiting the amount of current that flows across the transistor.

8. The relay circuitry of claim 1 wherein the switching circuitry comprises a first transistor in communication with a second transistor, and wherein a node that is in communication with both the first transistor and the second transistor is in communication with a ground terminal.

9. The relay circuitry of claim 8 wherein the first and second transistors are NMOS transistors.

10. The relay circuitry of claim 1 wherein the relay circuitry comprises a plurality of charge-pump circuits to support bidirectional operation.

11. The relay circuitry of claim 1 wherein the relay circuitry is implemented on a semiconductor device that utilizes the power supplied to the relay circuitry.

12. The relay circuitry of claim 1 wherein the relay circuitry is implemented in a power-over-Ethernet device that can utilize the power supplied to the relay circuitry, and wherein the power is supplied to the power-over-Ethernet device via an Ethernet link.

13. The relay circuitry of claim 12 wherein the power-over-Ethernet device is an IP phone.

14. The relay circuitry of claim 12 wherein the power supplied to the power-over-Ethernet device is supplied by the power-sourcing equipment via the Ethernet link.

15. The relay circuitry of claim 12 wherein the input signals are transmitted to transceiver circuitry implemented in the power-over-Ethernet device only during powered-on operation of the device, the powered-on operation corresponding to the period when the relay circuitry is in the open-switch state.

16. The relay circuitry of claim 14 wherein the power-sourcing equipment is a switch or a hub.

17. The relay circuitry of claim 14 wherein the power is supplied from the power-sourcing equipment to transformer circuitry implemented in the power-over-Ethernet device and in communication with the relay circuitry.

18. The relay circuitry of claim 14 wherein the relay circuitry is in communication with filter circuitry that processes the input signals to be relayed back to the power-sourcing equipment via the relay circuitry when the relay circuitry is in the closed-switch state.

19. The relay circuitry of claim 14 wherein the Ethernet link comprises a first pair and a second pair of differential input signals, and further wherein the input signals to the relay circuitry are transmitted via the first pair of differential input signals, and output signals of the relay circuitry are transmitted via the second pair of differential input signals.

20. The relay circuitry of claim 19 wherein the first pair of differential input signals is in communication with a first interface circuitry and the second pair of differential input signals is in communication with a second interface circuitry, the first interface circuitry and second interface circuitry each comprising:
    transformer circuitry in communication with a corresponding pair of the differential input signals; and
    transceiver circuitry in communication with the transformer circuitry.

21. The relay circuitry of claim 20 wherein the first interface circuitry and the second interface circuitry are both in communication with filter circuitry and the relay circuitry, such that the input signals that are transmitted to the first interface circuitry are filtered via the filter circuitry and relayed back to the power-sourcing equipment via the relay circuitry and through the second interface circuitry when the relay circuitry is in the closed-switch state.

22. A method for placing relay circuitry in a closed-switch state when power is not supplied by power-sourcing equipment to the circuitry and in an open-switch state when power is supplied by the power-sourcing equipment to the circuitry, the method comprising:
    storing charge from input signals to the relay circuitry when the input signals are of a first polarity;
    using the stored charge to maintain the relay circuitry in the closed-switch state when the input signals are of a second substantially reverse polarity; and
    switching the relay circuitry from the closed-switch state to the open-switch state when power is supplied by the power-sourcing equipment to the relay circuitry.

23. The method in claim 22 further comprising:
    receiving the input signals from power-supplying equipment; and
    relaying the received input signals to the power-supplying equipment when the relay circuitry is in the closed-switch state.

24. The method in claim 23 further comprising:
    filtering the received input signals before relaying the signals to the power-supplying equipment.

25. The method in claim 23 further comprising:
    transmitting the received input signals to transceiver circuitry when the relay circuitry is in the open-switch state.

26. Relay circuitry that operates in a closed-switch state when power is not supplied by power-sourcing equipment means to the circuitry and in an open-switch state when power is supplied by the power-sourcing equipment means to the circuitry, the relay circuitry comprising:
    means for causing the relay circuitry to be placed in the closed-switch state when power is not supplied by the power-sourcing equipment means to the relay circuitry, wherein the means for causing is operative to store charge from input signals to the relay circuitry when the input signals are of a first polarity, and to use the stored charge to maintain the relay circuitry in the closed-switch state when the input signals are of a second substantially reverse polarity; and
    means for switching the relay circuitry from the closed-switch state to the open-switch state when power is supplied by the power-sourcing equipment means to the relay circuitry.

27. The relay circuitry of claim 26 wherein the input signals correspond to a pair of differential input signals, and wherein the relay circuitry comprises a separate means for causing the relay circuitry to be placed in the closed-switch state for each differential input signal.

28. The relay circuitry of claim 26 further comprising:
    relay switch circuitry means in communication with the means for causing and the means for switching, wherein the means for switching switches the relay switch circuitry means from a closed-switch state to an open-switch state in order to switch the relay circuitry from the closed-switch state to the open-switch state.

29. The relay circuitry of claim 28 wherein the relay switch circuitry means comprises an NMOS transistor.

30. The relay circuitry of claim 26 wherein the charge-pump circuit comprises:
    transistor means having a gate terminal, a drain terminal, and a source terminal; and
    capacitor means, wherein the capacitor means is in communication with both the gate terminal and either the drain or source terminal of the transistor means.

31. The relay circuitry of claim 30 wherein the transistor means is a PMOS transistor.

32. The relay circuitry of claim 30 wherein the means for causing further comprises a current-limiting resistor means for limiting the amount of current that flows across the transistor means.

33. The relay circuitry of claim 26 wherein the means for switching comprises a first transistor means in communication with a second transistor means, and wherein a node that is in communication with both the first transistor means and the second transistor means is in communication with a ground terminal.

34. The relay circuitry of claim 33 wherein the first and second transistor means are NMOS transistors.

35. The relay circuitry of claim 33 wherein the node in communication with the first and second terminals is also in communication with a capacitor means that is in communication with the ground terminal, wherein the capacitor means provides a filtering function.

36. The relay circuitry of claim 26 wherein the relay circuitry comprises a plurality of means for causing the relay circuitry to be placed in the closed-switch state to support bidirectional operation.

37. The relay circuitry of claim 26 wherein the relay circuitry is implemented on semiconductor device means that utilizes the power supplied to the relay circuitry.

38. The relay circuitry of claim 26 wherein the relay circuitry is implemented in power-over-Ethernet device means that can utilize the power supplied to the relay circuitry, and wherein the power is supplied to the power-over-Ethernet device means via Ethernet link means.

39. The relay circuitry of claim 38 wherein the power-over-Ethernet device means is an IP phone.

40. The relay circuitry of claim 38 wherein the power supplied to the power-over-Ethernet device means is supplied by the power-sourcing equipment means via the Ethernet link means.

41. The relay circuitry of claim 38 wherein the input signals are transmitted to transceiver circuitry means implemented in the power-over-Ethernet device means only during powered-on operation of the device, the powered-on operation corresponding to the period when the relay circuitry is in the open-switch state.

42. The relay circuitry of claim 40 wherein the power-sourcing equipment means is a switch or a hub.

43. The relay circuitry of claim 40 wherein the power is supplied from the power-sourcing equipment means to transformer circuitry means implemented in the power-over-Ethernet device means and in communication with the relay circuitry.

44. The relay circuitry of claim 40 wherein the relay circuitry is in communication with filter circuitry means that processes the input signals to be relayed back to the power-sourcing equipment means via the relay circuitry when the relay circuitry is in the closed-switch state.

45. The relay circuitry of claim 40 wherein the Ethernet link means comprises a first pair and a second pair of differential input signals, and further wherein the input signals to the relay circuitry are transmitted via the first pair of differential input signals, and output signals of the relay circuitry are transmitted via the second pair of differential input signals.

46. The relay circuitry of claim 45 wherein the first pair of differential input signals is in communication with a first interface circuitry means and the second pair of differential input signals is in communication with a second interface circuitry means, the first interface circuitry means and second interface circuitry means each comprising:
  transformer circuitry means in communication with a corresponding pair of the differential input signals; and
  transceiver circuitry means in communication with the transformer circuitry means.

47. The relay circuitry of claim 46 wherein the first interface circuitry means and the second interface circuitry means are both in communication with filter circuitry means and the relay circuitry, such that the input signals that are transmitted to the first interface circuitry means are filtered via the filter circuitry means and relayed back to the power-sourcing equipment via the relay circuitry and through the second interface circuitry means when the relay circuitry is in the closed-switch state.

* * * * *